United States Patent
Kawakami

(10) Patent No.: US 11,611,749 B2
(45) Date of Patent: Mar. 21, 2023

(54) ENCODING APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Masashi Kawakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 17/033,466

(22) Filed: Sep. 25, 2020

(65) Prior Publication Data

US 2021/0099708 A1 Apr. 1, 2021

(30) Foreign Application Priority Data

Oct. 1, 2019 (JP) .............................. JP2019-181652

(51) Int. Cl.
*H04N 19/13* (2014.01)
*H04N 5/232* (2006.01)
*H04N 5/765* (2006.01)
*H04N 5/917* (2006.01)

(52) U.S. Cl.
CPC ......... *H04N 19/13* (2014.11); *H04N 5/23229* (2013.01); *H04N 5/765* (2013.01); *H04N 5/917* (2013.01)

(58) Field of Classification Search
CPC .... H04N 19/13; H04N 5/23229; H04N 5/765; H04N 5/917
See application file for complete search history.

(56) References Cited

U.S. PATENT DOCUMENTS

| | | | | |
|---|---|---|---|---|
| 2003/0169278 A1* | 9/2003 | Obrador | ............. | H04N 5/23245 386/E5.072 |
| 2005/0226518 A1* | 10/2005 | Suzuki | ................. | H04N 19/172 382/246 |
| 2008/0309960 A1* | 12/2008 | Kinoshita | .............. | G06K 17/00 358/1.13 |
| 2009/0273686 A1* | 11/2009 | Kaikumaa | .......... | H04N 5/23293 348/222.1 |

(Continued)

FOREIGN PATENT DOCUMENTS

JP 2015226172 A 12/2015

OTHER PUBLICATIONS

ITU-T, Series H: Audiovisual and Multimedia Systems Infrastructure of audiovisual services—Coding of moving video, Recommendation ITU-T H.265, Feb. 2018, pp. 1-692.

*Primary Examiner* — Sunghyoun Park
(74) *Attorney, Agent, or Firm* — Canon U.S.A., Inc. IP Division

(57) ABSTRACT

There is provided an encoding apparatus. A data processing unit generates binary data by performing data processing, including binarization processing, with respect to image data that has been input from an image capturing unit. An arithmetic coding unit generates arithmetic code data by performing arithmetic coding of the binary data. A control unit performs control so as to record the arithmetic code data into a recording unit. When the image data is still image data generated during continuous shooting of still images, the control unit performs control so as to record the binary data into the recording unit without generating the arithmetic code data.

9 Claims, 6 Drawing Sheets

(56) References Cited

U.S. PATENT DOCUMENTS

| | | | | |
|---|---|---|---|---|
| 2013/0286250 A1* | 10/2013 | Kumar | ............... | H04N 9/8047 |
| | | | | 348/E5.024 |
| 2015/0287435 A1* | 10/2015 | Land | ................. | H04N 9/8042 |
| | | | | 386/241 |
| 2018/0184041 A1* | 6/2018 | Kunieda | ............... | H04N 5/917 |

* cited by examiner

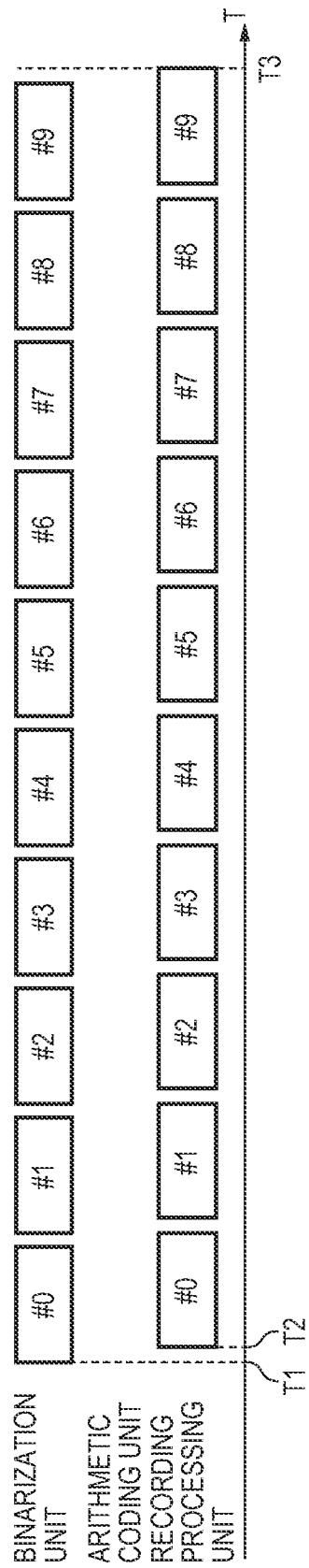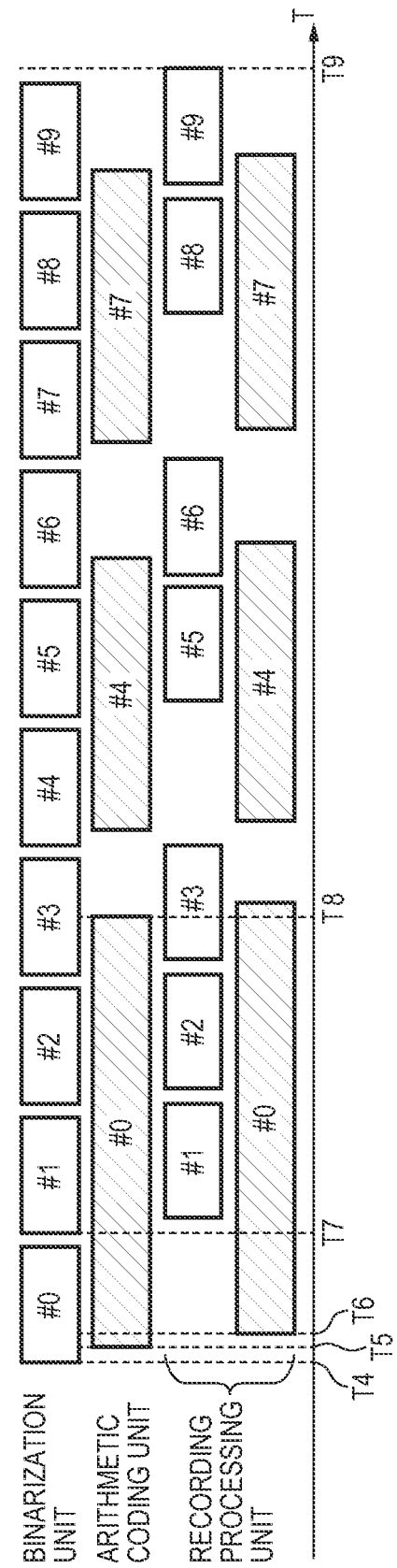

ENCODING APPARATUS, IMAGE CAPTURING APPARATUS, CONTROL METHOD, AND STORAGE MEDIUM

BACKGROUND OF THE INVENTION

Field of the Invention

The present invention relates to an encoding apparatus, an image capturing apparatus, a control method, and a storage medium.

Description of the Related Art

In recent years, as digital cameras and digital camcorders, some products have a continuous still image shooting capability, which is the capability of shooting several tens of frames per second. Furthermore, a high-efficiency encoding method, typically H.265, has been developed, and still image formats have been defined (e.g., ITU-T, "SERIES H: AUDIOVISUAL AND MULTIMEDIA SYSTEMS Infrastructure of audiovisual services—Coding of moving video", Recommendation TU-T H.265, February, 2018).

According to H.265, CABAC (Context Adaptive Binary Arithmetic Coding) is used as entropy encoding. CABAC is divided into binarization processing for binarizing an input value of an encoding target, and processing for performing arithmetic coding of binary data obtained through the binarization processing (binary arithmetic coding). The binary arithmetic coding processing in the latter stage has a high compression rate compared to, for example, Huffman encoding because it is bit processing, but has a problem of slow processing speed.

The image quality can be improved by, for example, controlling the amount of codes while feeding back the amount of generated codes and predicting the amount of codes to be generated next. However, the binary arithmetic coding processing is slow, thereby leading to the problem of delayed feedback of the amount of generated codes and a reduction in the accuracy of control on the amount of codes.

In view of this problem, there has been a proposal of a technique to accelerate the feedback of the amount of generated codes and improve the accuracy of control on the amount of codes by performing up to the binarization processing on an image capturing apparatus and executing the binary arithmetic coding processing outside the image capturing apparatus, e.g., on a cloud capable of high-speed processing (e.g., Japanese Patent Laid-Open No. 2015-226172).

When a moving image is recorded using the technique of Japanese Patent Laid-Open No. 2015-226172, processing requires time because binary arithmetic coding of a stream to be recorded itself is performed using a binary arithmetic coding processing unit inside the image capturing apparatus. However, control is performed so that leveling is achieved by adjusting the amount of codes to be generated on a per-frame basis, and the arithmetic coding processing is completed by a recording timing. On the other hand, when still images are encoded, encoding control that prioritizes the image quality is performed, rather than encoding control that brings the amount of codes per image in consistency with a predetermined amount of codes. Therefore, when still images have been shot in a high-image-quality mode, encoding is performed without significantly reducing the amount of information, and thus the amount of codes per image becomes large. Furthermore, in the case of continuous shooting of still images, due to the massive amount of generated codes in every picture and the short interval of continuous shooting, there is a case where the binary arithmetic coding processing cannot be completed before the next image to be processed is input, and the speed of continuous shooting decreases.

SUMMARY OF THE INVENTION

The present invention has been made in view of the foregoing situation, and provides a technique to control encoding so as to suppress a reduction in the speed of continuous shooting of still images on an encoding apparatus that is capable of executing binarization processing and arithmetic coding processing.

According to a first aspect of the present invention, there is provided an encoding apparatus, comprising: a data processing unit configured to generate binary data by performing data processing, including binarization processing, with respect to image data that has been input from an image capturing unit; an arithmetic coding unit configured to generate arithmetic code data by performing arithmetic coding of the binary data; and a control unit configured to perform control so as to record the arithmetic code data into a recording unit, wherein when the image data is still image data generated during continuous shooting of still images, the control unit performs control so as to record the binary data into the recording unit without generating the arithmetic code data.

According to a second aspect of the present invention, there is provided an image capturing apparatus, comprising: the encoding apparatus according to the first aspect; and the image capturing unit.

According to a third aspect of the present invention, there is provided a control method executed by an encoding apparatus, the encoding apparatus comprising: a data processing unit configured to generate binary data by performing data processing, including binarization processing, with respect to image data that has been input from an image capturing unit; and an arithmetic coding unit configured to generate arithmetic code data by performing arithmetic coding of the binary data, the control method comprising performing control so as to record the arithmetic code data into a recording unit, wherein when the image data is still image data generated during continuous shooting of still images, control is performed so as to record the binary data into the recording unit without generating the arithmetic code data.

According to a fourth aspect of the present invention, there is provided a non-transitory computer-readable storage medium which stores a program for causing a computer of an encoding apparatus to execute a control method, the encoding apparatus comprising: a data processing unit configured to generate binary data by performing data processing, including binarization processing, with respect to image data that has been input from an image capturing unit; and an arithmetic coding unit configured to generate arithmetic code data by performing arithmetic coding of the binary data, the control method comprising performing control so as to record the arithmetic code data into a recording unit, wherein when the image data is still image data generated during continuous shooting of still images, control is performed so as to record the binary data into the recording unit without generating the arithmetic code data.

Further features of the present invention will become apparent from the following description of exemplary embodiments with reference to the attached drawings.

BRIEF DESCRIPTION OF THE DRAWINGS

FIGS. 6A and 6B are timing charts of the operations of a binarization unit 114, an arithmetic coding unit 117, and a recording processing unit 118 in the encoding processing during continuous shooting of still images.

DESCRIPTION OF THE EMBODIMENTS

Figure 1:
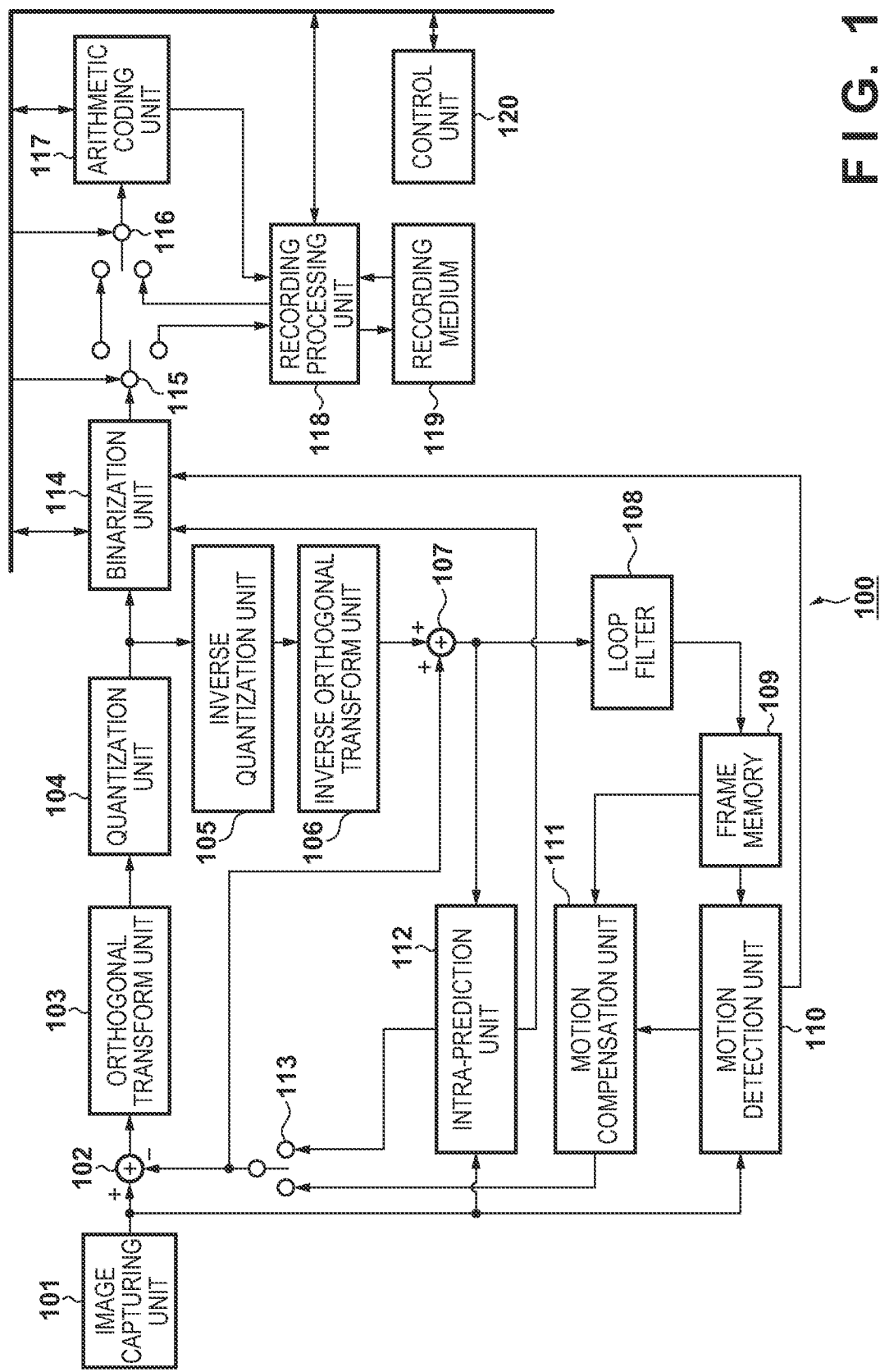
FIG. 1 is a block diagram showing an exemplary configuration of an encoding apparatus 100.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an exemplary configuration of an encoding apparatus 100 according to a first embodiment. The encoding apparatus 100 may be included in an image capturing apparatus, or may be included in another apparatus (e.g., a personal computer and the like). In the following description, it is assumed that the encoding apparatus 100 supports H.265, but the present embodiment is not limited to H.265.

The encoding apparatus 100 includes an image capturing unit 101, an adder 102, an orthogonal transform unit 103, a quantization unit 104, an inverse quantization unit 105, an inverse orthogonal transform unit 106, an adder 107, a loop filter 108, a frame memory 109, and a motion detection unit 110. The encoding apparatus 100 also includes a motion compensation unit 111, an intra-prediction unit 112, a switch 113, a binarization unit 114, a switch 115, a switch 116, an arithmetic coding unit 117, a recording processing unit 118, a recording medium 119, and a control unit 120.

The control unit 120 includes a ROM that stores a control program and a RAM that is used as a working memory, and controls an entirety of the encoding apparatus 100 in accordance with the control program. Especially, the control unit 120 controls the binarization unit 114, switch 115, switch 116, arithmetic coding unit 117, and recording processing unit 118.

Also, exchange of data among the binarization unit 114, arithmetic coding unit 117, and recording processing unit 118 is performed via a memory (not shown). The memory is a storage region which is intended to store data and which is composed of, for example, a volatile memory.

The image capturing unit 101 has a lens optical system which includes an optical lens, a diaphragm, a focus control unit, and a lens driving unit and which is capable of optical zooming. The image capturing unit 101 also includes an image sensor, such as a CCD image sensor and a CMOS image sensor, that converts light information from the lens optical system into electrical signals. The image capturing unit 101 generates image data by converting the electrical signals obtained by the image sensor into digital signals, and performs development processing such as demosaicing processing, noise removal processing, optical distortion correction processing, and color correction processing; as a result, an input image to be encoded is generated.

The adder 102 generates a difference image from the input image input from the image capturing unit 101 and a later-described prediction image generated by the intra-prediction unit 112 or the motion compensation unit 111. The orthogonal transform unit 103 performs orthogonal transform with respect to the difference image. The orthogonal transform is, for example, discrete cosine transform (DCT transform) or discrete sine transform (DST transform).

The quantization unit 104 applies quantization processing to a transform coefficient that has been obtained through the orthogonal transform performed by the orthogonal transform unit 103. In this way, information of mainly high-frequency components of the input image can be reduced, and the amount of information can be compressed. The inverse quantization unit 105 performs inverse quantization processing with respect to data that has been quantized by the quantization unit 104. The inverse orthogonal transform unit 106 performs inverse orthogonal transform with respect to the inversely quantized data.

The adder 107 generates a local decoded image by adding a difference image generated by the inverse orthogonal transform unit 106 and a later-described prediction image output from the switch 113. The generated local decoded image is output to the intra-prediction unit 112 and the loop filter 108.

The loop filter 108 removes blockiness by applying filter processing to the local decoded image in units of prediction processing (units of PU blocks) or in units of transform/quantization processing (units of TU blocks) for the local decoded image. This improves the quality of the local decoded image that is used as a reference image. The local decoded image after the filter processing is stored into the frame memory 109. The frame memory 109 is a memory that stores the local decoded image. The stored local decoded image is used as a reference image at the time of inter-frame prediction.

The motion detection unit 110 calculates motion vectors for respective blocks in order to reduce the difference between the original image and the reference image when inter-frame prediction is performed. The calculated motion vectors are output to the motion compensation unit 111 and the binarization unit 114. The motion compensation unit 111 generates a prediction image based on the input motion vectors and reference image. The generated prediction image is output to the switch 113.

The intra-prediction unit 112 performs intra-frame prediction. The intra-prediction unit 112 receives, as inputs, the local decoded image output from the adder 107 and the input image output from the image capturing unit 101, and generates a prediction image by performing intra-frame prediction. The intra-prediction unit 112 outputs the prediction image to the switch 113, and outputs information of a prediction mode and the like to the binarization unit 114.

The switch 113 selects the prediction image output from the intra-prediction unit 112 at the time of intra-frame prediction, selects the prediction image output from the motion compensation unit 111 at the time of inter-frame prediction, and outputs the selected prediction image to the adder 102. As stated earlier, the adder 102 generates the difference image from the input image and the prediction image.

The binarization unit 114 receives, as inputs, a transform coefficient and encoding parameters (e.g., motion vectors and a prediction mode) produced in the encoding process, generates binary data by performing binarization processing in a procedure defined by a standard, and outputs the binary data to the switch 115.

The switch 115 switches between output destinations in accordance with a control signal of the control unit 120. The switch 116 similarly switches between input sources in accordance with a control signal of the control unit 120. A control method for the switch 115 and the switch 116 will be described later.

The arithmetic coding unit 117 receives, as the input, the binary data generated by the binarization unit 114, and performs compression processing by performing arithmetic coding processing. Based on an algorithm, the arithmetic coding processing can process only one bit of the binary data in one cycle, and requires processing time in proportion to the bit rate of the binary data.

The binarization of the binarization unit 114 and the arithmetic coding of the arithmetic coding unit 117 are, in combination, referred to as entropy encoding.

The recording processing unit 118 records the binary data generated by the binarization unit 114 or arithmetic code data generated by the arithmetic coding unit 117 into the recording medium 119. The recording medium 119 is a recording medium composed of, for example, a nonvolatile memory.

Figure 2:
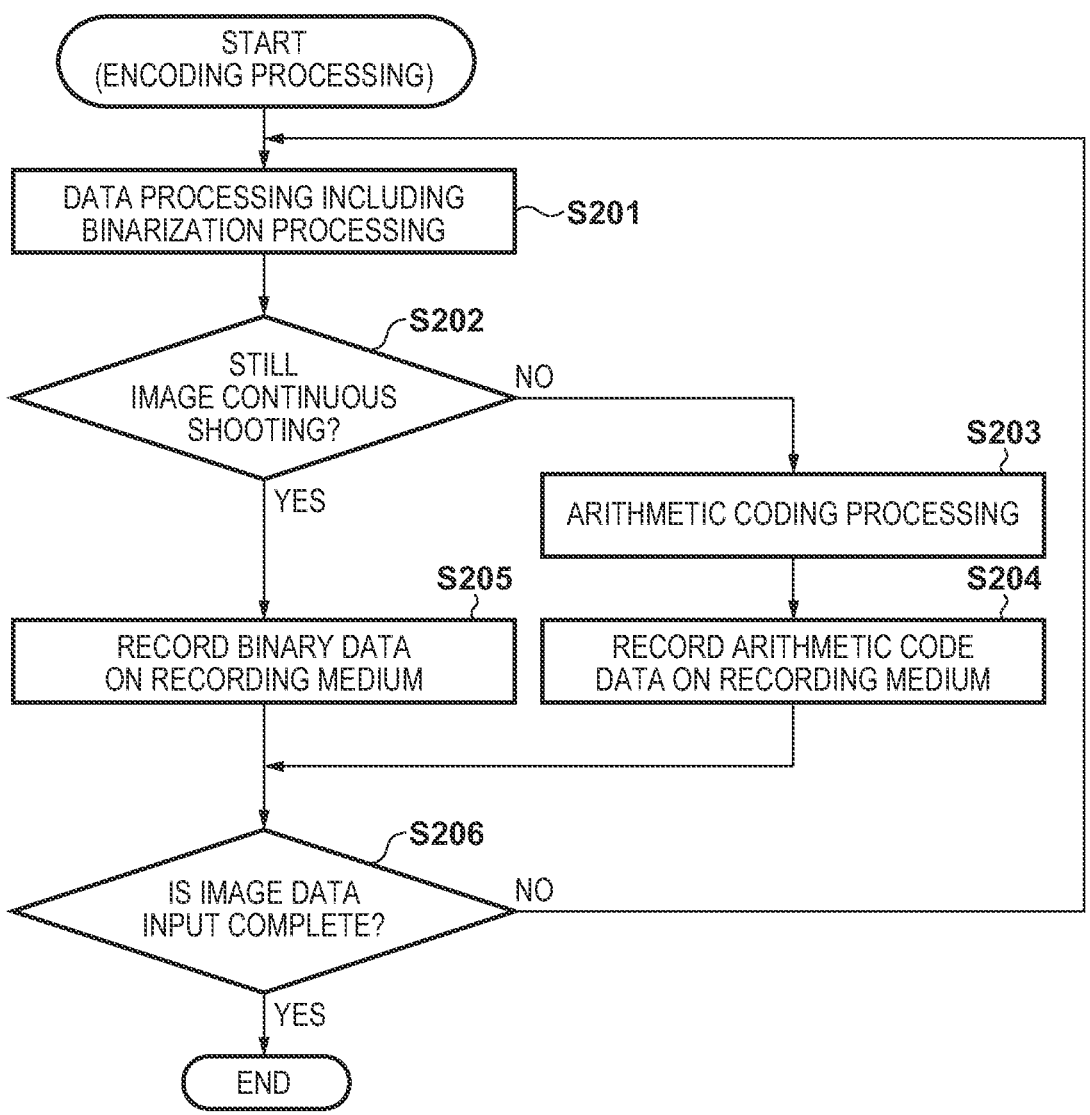
FIG. 2 is a flowchart of encoding processing executed by the encoding apparatus 100 according to a first embodiment.

FIG. 2 is a flowchart of encoding processing executed by the encoding apparatus 100. Processing of each step of the present flowchart is realized by the control unit 120 controlling each component of the encoding apparatus 100 in accordance with the control program, unless specifically stated otherwise.

In step S201, the control unit 120 performs control so as to perform data processing, including the binarization processing performed by the binarization unit 114, with respect to the image data input from the image capturing unit 101. As a result, binary data is generated. The data processing includes the orthogonal transform processing performed by the orthogonal transform unit 103, the quantization processing performed by the quantization unit 104, and the like, in addition to the binarization processing. Furthermore, when the image data to be processed is moving image frame data generated during shooting of a moving image, the data processing also includes prediction processing that uses the motion compensation unit 111 or the intra-prediction unit 112. In addition, also when the image data to be processed is still image data, the data processing may include prediction processing that uses the motion compensation unit 111 or the intra-prediction unit 112 as necessary. For example, when the image data to be processed is still image data generated during continuous shooting of still images, prediction processing that is similar to that for the case of the moving image frame data can be performed with respect to this still image data. Alternatively, in the case of continuous shooting of still images, it is permissible to adopt a configuration in which intra-frame prediction processing that uses the intra-prediction unit 112 is performed with respect to all of a plurality of pieces of still image data obtained. In this case, still image data can be decoded independently (without referring to another still image data).

In step S202, the control unit 120 determines whether the image capturing unit 101 is currently executing continuous shooting of still images in which still images are shot continuously. When the image capturing unit 101 is not currently executing continuous shooting of still images (i.e., when the image data to be processed is still image data generated by shooting of a single still image, when the image data to be processed is moving image frame data generated during shooting of a moving image, and the like), processing proceeds to step S203. When the image capturing unit 101 is currently executing continuous shooting of still images (i.e., when the image data to be processed is still image data generated during continuous shooting of still images), processing proceeds to step S205.

In step S203, the arithmetic coding unit 117 generates arithmetic code data by performing arithmetic coding of the binary data generated in step S202. At this time, the control unit 120 controls the switch 115 and the switch 116 so that the binary data output from the binarization unit 114 is input to the arithmetic coding unit 117.

In step S204, the recording processing unit 118 records the arithmetic code data generated by the arithmetic coding unit 117 into the recording medium 119.

In step S205, the recording processing unit 118 records the binary data generated in step S202 into the recording medium 119. At this time, the control unit 120 controls the switch 115 so that the binary data output from the binarization unit 114 is input to the recording processing unit 118. In this way, when the image data to be processed is still image data generated during continuous shooting of still images, control is performed so as to record the binary data as is into the recording medium 119 without generating the arithmetic code data. The control unit 120 records, into the recording medium 119 or a nonvolatile memory inside the control unit 120, information indicating that the binary data has been recorded into the recording medium 119.

In step S206, the control unit 120 determines whether inputting of image data has been completed. When inputting of image data has not been completed, the control unit 120 executes processing from step S201 again, using the next image data as the image data to be processed. When inputting of image data has been completed, the encoding processing of the present flowchart is ended.

When still image data is encoded using the encoding apparatus 100, the amount of data output from the binarization unit 114 varies depending on the image quality mode that is set. The higher the image quality of the mode, the smaller the quantization value used in the quantization unit 104, and thus the larger the amount of output data of the binarization unit 114. In this case, executing the arithmetic coding will increase the amount of input data of the arithmetic coding unit 117. As the arithmetic coding unit 117 can only perform one-bit processing, processing time is extended. This extension of processing time becomes a bottleneck that leads to a reduction in the speed of continuous shooting. In the present embodiment, as stated earlier, control is performed so as to record the binary data as is into the recording medium 119 without generating the arithmetic code data during continuous shooting of still images. Therefore, the occurrence of the bottleneck associated with the arithmetic coding can be prevented, and the reduction in the speed of continuous shooting can be suppressed.

Note that according to the foregoing description, when the image data to be processed is moving image frame data generated during shooting of a moving image, processing makes a transition from step S202 to step S203, and the arithmetic coding is performed. However, it is permissible to adopt a configuration in which processing makes a transition from step S202 to step S205, that is, a configuration in which the binary data is recorded as is into the recording medium 119 without generating the arithmetic code data, also when the image data to be processed is moving image frame data generated during shooting of a moving image. This makes it possible to accelerate the frame rate and improve the image quality of a moving image.

Figure 3:
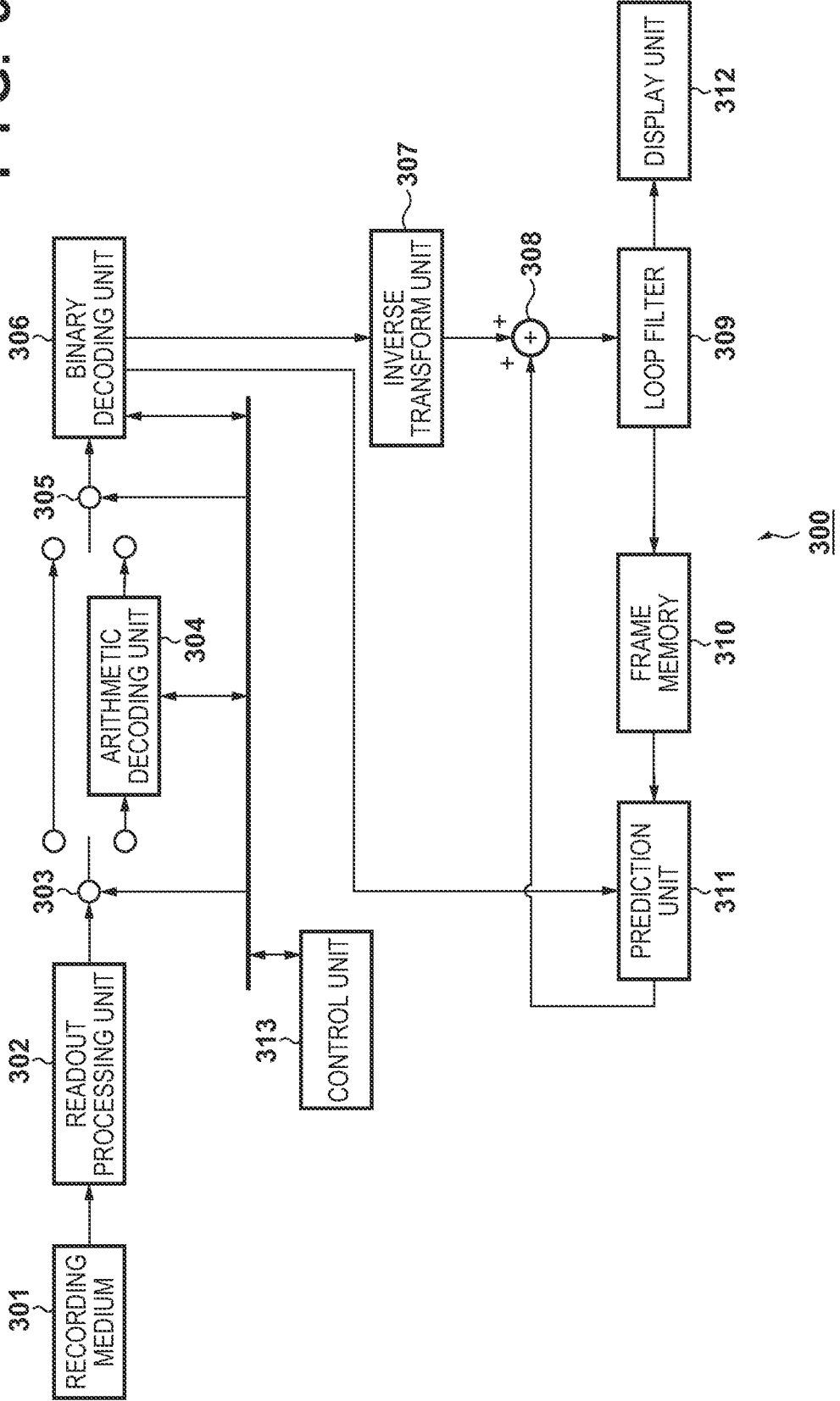
FIG. 3 is a block diagram showing an exemplary configuration of a decoding apparatus 300 that decodes data encoded by the encoding apparatus 100.

Next, with reference to FIG. 3, a description is given of an exemplary configuration of a decoding apparatus 300 that decodes data encoded by the encoding apparatus 100. The decoding apparatus 300 may be included inside an image capturing apparatus together with the encoding apparatus 100, or may be included inside a reproduction apparatus different from an image capturing apparatus that includes the encoding apparatus 100.

The decoding apparatus 300 includes a recording medium 301, a readout processing unit 302, a switch 303, an arithmetic decoding unit 304, a switch 305, a binary decoding unit 306, an inverse transform unit 307, and an adder 308. The decoding apparatus 300 also includes a loop filter 309, a frame memory 310, a prediction unit 311, a display unit 312, and a control unit 313.

The control unit 313 includes a ROM that stores a control program and a RAM that is used as a working memory, and controls an entirety of the decoding apparatus 300 in accordance with the control program. Especially, the control unit 313 controls the switch 303, switch 305, arithmetic decoding unit 304, and binary decoding unit 306.

The recording medium 301 is a recording medium in which binary data or arithmetic code data encoded by the encoding apparatus 100 is recorded and which is composed of a nonvolatile memory. The readout processing unit 302 reads out and outputs the binary data or the arithmetic code data recorded in the recording medium 301.

The switch 303 switches between output destinations in accordance with a control signal of the control unit 313. The switch 305 similarly switches between input sources in accordance with a control signal of the control unit 313. A control method for the switch 303 and the switch 305 will be described later.

The arithmetic decoding unit 304 decodes the arithmetic code data encoded by the arithmetic coding unit 117. The decoded data matches the binary data generated by the binarization unit 114.

The binary decoding unit 306 receives, as an input, the binary data recorded in the recording medium 301 or the binary data generated by the arithmetic decoding unit 304, and decodes the binary data. Decoded information includes a quantization coefficient generated by the quantization unit 104, auxiliary information which is typically the motion vectors generated by the motion detection unit 110, and the like.

The inverse transform unit 307 performs inverse quantization and inverse transform with respect to the decoded quantization coefficient, thereby generating a difference image. The prediction unit 311 performs inter-frame prediction or intra-frame prediction using the auxiliary information decoded by the binary decoding unit 306, thereby generating a prediction image.

The adder 308 generates a decoded image by adding the difference image and the prediction image. The display unit 312 is a display device which displays the decoded image and the input image and which accompanies an image capturing apparatus. The frame memory 310 is a memory in which the decoded image isrecorded. The loop filter 309 applies filter processing to the decoded image, and outputs the resultant decoded image to the display unit 312 and also to the frame memory 310.

Next, a description is given of control on the switch 303 and the switch 305 and the operations of the arithmetic decoding unit 304 and the binary decoding unit 306. Information indicating that the encoding apparatus 100 has performed continuous shooting of still images and binary data has been recorded into the recording medium 301 is recorded by the control unit 120 into the recording medium 119 or the nonvolatile memory at the time of encoding. Therefore, the control unit 313 can determine whether binary data exists in the recording medium 301 by referring to the information recorded in the recording medium 301 or the nonvolatile memory. It is assumed that the recording medium 119 and the recording medium 301 are the same recording medium.

When an instruction for reproducing a recorded image has been issued to the decoding apparatus 300, the control unit 313 determines whether the image to be reproduced is recorded in the recording medium 301 as binary data. When the image to be reproduced is recorded as binary data, the control unit 313 controls the switch 303 and the switch 305 so that the readout processing unit 302 inputs the binary data to the binary decoding unit 306. On the other hand, when the image to be reproduced is recorded as arithmetic code data, the control unit 313 controls the switch 303 so that the readout processing unit 302 inputs the arithmetic code data to the arithmetic decoding unit 304, and controls the switch 305 so that the output from the arithmetic decoding unit 304 is input to the binary decoding unit 306.

By performing control in this manner, even if binary data has been recorded into the recording medium 119 (recording medium 301), the image can be reproduced when the image reproduction is performed on the decoding apparatus 300.

However, when the image reproduction is performed on a reproduction apparatus that does not include the decoding apparatus 300, image data cannot be decoded accurately if the binary data is left as is. In view of this, the encoding apparatus 100 performs processing for generating arithmetic code data from binary data so as to enable decoding of image data even on a reproduction apparatus that does not include the decoding apparatus 300.

Figure 4:
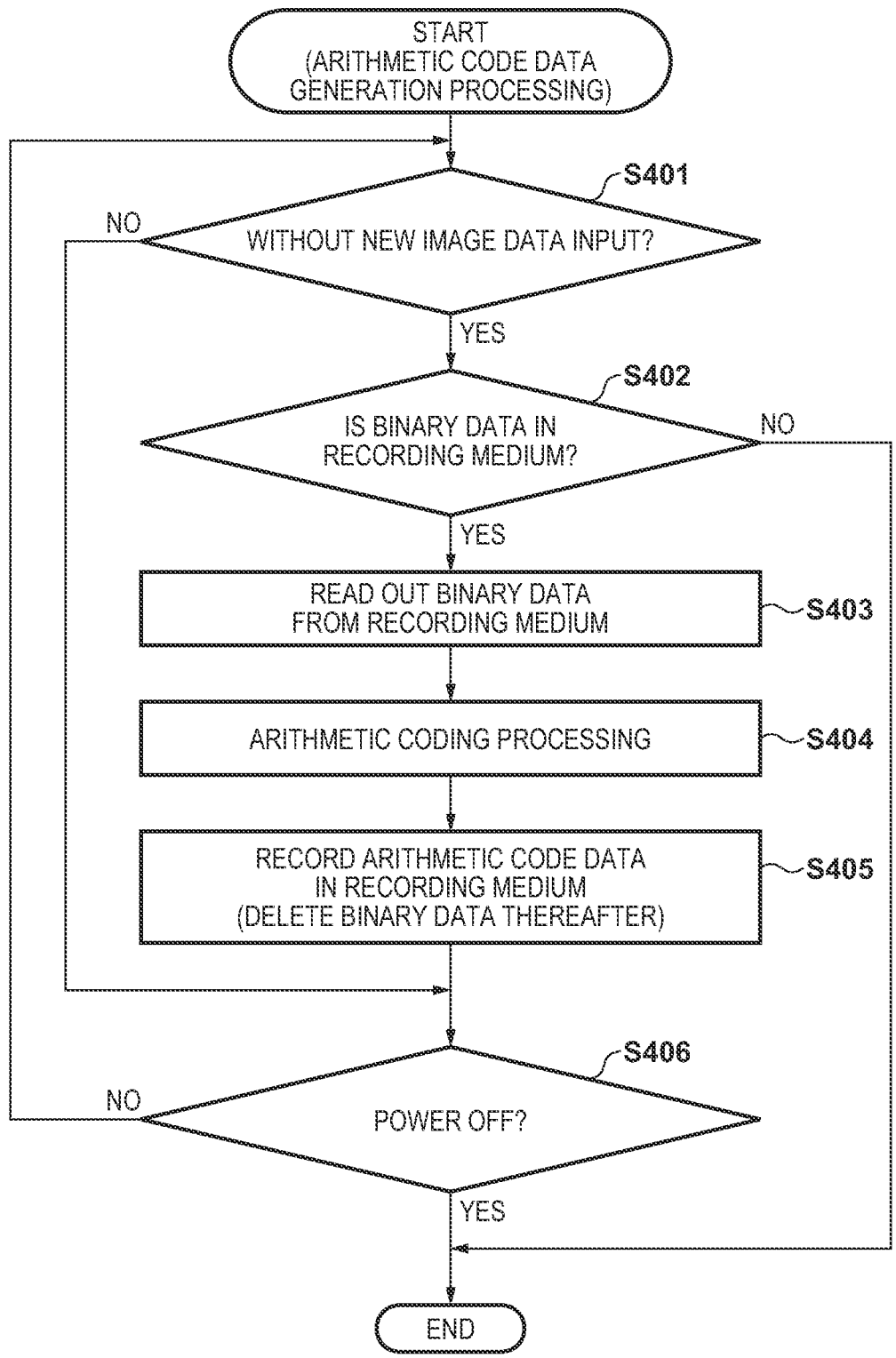
FIG. 4 is a flowchart of processing executed by the encoding apparatus 100 to generate arithmetic code data according to the first embodiment.

FIG. 4 is a flowchart of processing executed by the encoding apparatus 100 to generate arithmetic code data. Processing of each step of the present flowchart is realized by the control unit 120 controlling each component of the encoding apparatus 100 in accordance with the control program, unless specifically stated otherwise. Each time the image capturing unit 101 performs shooting, the processing for generating arithmetic code data according to the present flowchart is executed.

In step S401, the control unit 120 determines whether new image data has been input from the image capturing unit 101. When new image data has not been input from the image capturing unit 101 (e.g., when in a shooting standby state and the like), processing proceeds to step S402; when new image data has been input from the image capturing unit 101, processing proceeds to step S406.

In step S402, the control unit 120 determines whether binary data is recorded in the recording medium 119. As described in step S205 of FIG. 2, information indicating that binary data is recorded in the recording medium 119 is recorded in the recording medium 119 or the nonvolatile memory inside the control unit 120. Therefore, the control unit 120 can determine whether binary data is recorded in the recording medium 119 by referring to a specific region in the recording medium 119 or the nonvolatile memory. When binary data is recorded in the recording medium 119, processing proceeds to step S403. When binary data is not recorded in the recording medium 119, the processing for generating arithmetic code data according to the present flowchart is ended. Note that when the image capturing unit 101 has performed shooting again, the processing for generating arithmetic code data according to the present flowchart is resumed.

In step S403, the recording processing unit 118 reads out the binary data recorded in the recording medium 119. At this time, the control unit 120 controls the switch 116 so that the binary data that has been read out from the recording medium 119 is input to the arithmetic coding unit 117.

In step S404, the arithmetic coding unit 117 generates arithmetic code data by performing arithmetic coding of the binary data that has been read out from the recording medium 119.

In step S405, the recording processing unit 118 records the arithmetic code data generated by the arithmetic coding unit 117 into the recording medium 119. Thereafter, the recording processing unit 118 may delete the binary data from the recording medium 119.

In step S406, the control unit 120 determines whether an instruction for turning OFF the power of the encoding apparatus 100 has been issued. When the instruction for turning OFF the power has not been issued, processing returns to step S401. When the instruction for turning OFF the power has been issued, the processing for generating arithmetic code data according to the present flowchart is ended.

In the above-described manner, in a period in which the image capturing unit 101 has not input new image data, the encoding apparatus 100 generates arithmetic code data by performing arithmetic coding of binary data recorded in the recording medium 119, and records the arithmetic code data into the recording medium 119. This makes it possible to record, into the recording medium 119, data that can be decoded even on a reproduction apparatus that does not include the decoding apparatus 300.

As described above, according to the first embodiment, the encoding apparatus 100 generates binary data by performing data processing, including binarization processing, with respect to image data input from the image capturing unit 101. When the image data is still image data generated during continuous shooting of still images, the encoding apparatus 100 performs control so as to record the binary data into the recording medium 119 without generating arithmetic code data. This makes it possible to suppress a reduction in the speed of continuous shooting of still images.

Second Embodiment

A second embodiment describes a configuration in which, even during continuous shooting of still images, arithmetic code data is generated by performing arithmetic coding of binary data that corresponds to image data to be processed when arithmetic coding of another binary data is not currently in execution. In the second embodiment, basic configurations of the encoding apparatus 100 and the decoding apparatus 300 are similar to those of the first embodiment (see FIG. 1 and FIG. 3). The following mainly describes differences from the first embodiment.

Figure 5:
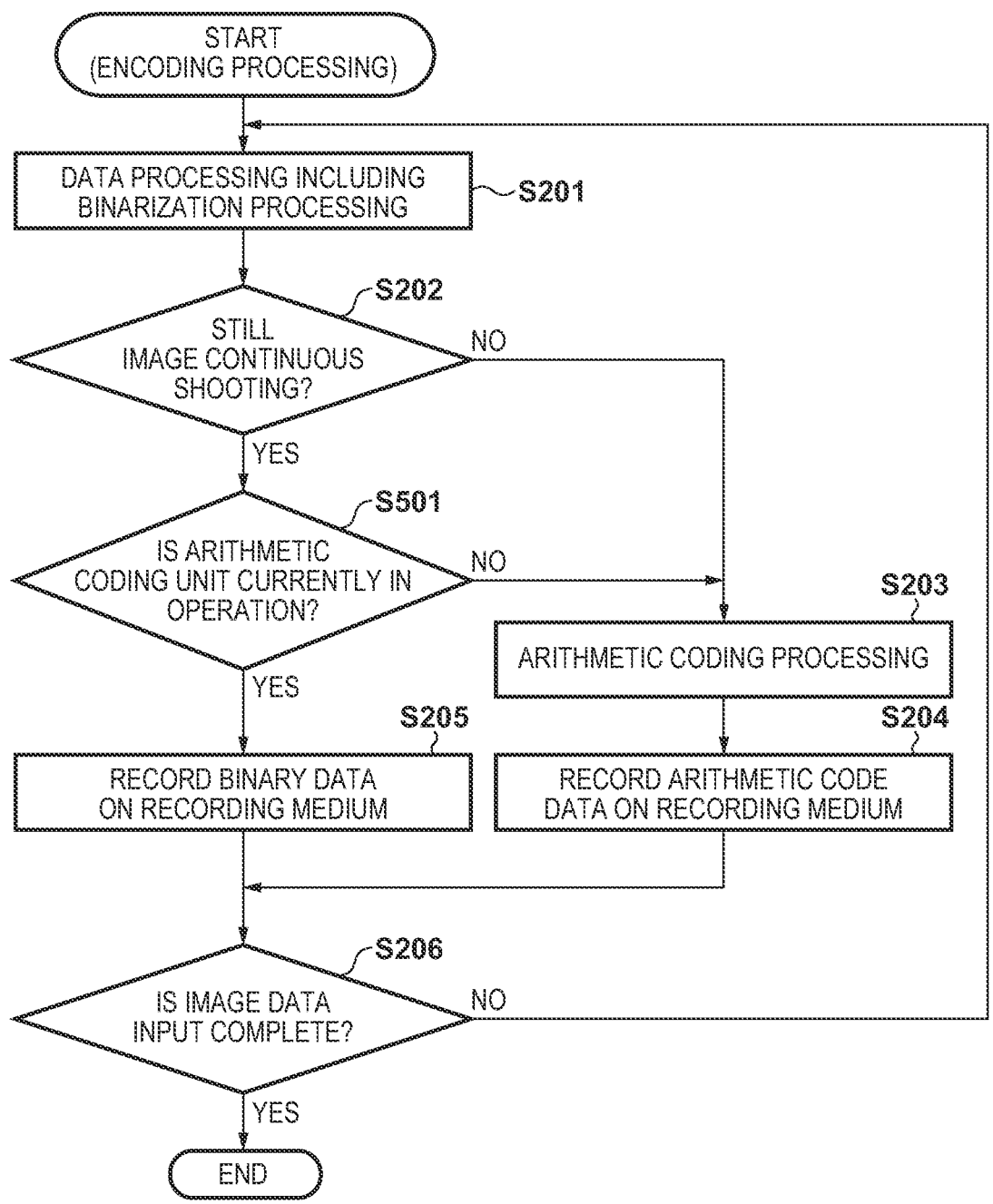
FIG. 5 is a flowchart of encoding processing executed by the encoding apparatus 100 according to a second embodiment.

FIG. 5 is a flowchart of encoding processing executed by the encoding apparatus 100. In FIG. 5, steps that execute processing that is the same as or similar to processing of FIG. 2 are given the same reference numerals as in FIG. 2, and a description thereof is omitted. Processing of each step of the present flowchart is realized by the control unit 120 controlling each component of the encoding apparatus 100 in accordance with the control program, unless specifically stated otherwise.

When it is determined that continuous shooting of still images is currently in execution (i.e., the image data to be processed is still image data generated during continuous shooting of still images) in step S202, the control unit 120 determines whether the arithmetic coding unit 117 is currently in operation in step S501. When the arithmetic coding unit 117 is not currently in operation (i.e., when the arithmetic coding unit 117 is not currently executing arithmetic coding of another binary data), processing proceeds to step S203. When the arithmetic coding unit 117 is currently in operation (i.e., when the arithmetic coding unit 117 is currently executing arithmetic coding of another binary data), processing proceeds to step S205.

Next, with reference to FIGS. 6A and 6B, a description is given of the difference between the encoding processing during continuous shooting of still images according to the first embodiment (FIG. 2) and the encoding processing during continuous shooting of still images according to the second embodiment (FIG. 5). FIGS. 6A and 6B are timing charts of the operations of the binarization unit 114, arithmetic coding unit 117, and recording processing unit 118 in the encoding processing during continuous shooting of still images. In FIGS. 6A and 6B, portions represented by quadrilaterals indicate that respective processing units are currently in operation, and numerical values inside the quadrilaterals are frame numbers that have been allocated in order of input to the encoding apparatus 100. For example, a quadrilateral with #0 indicates a processing period for the first frame.

FIG. 6A corresponds to the first embodiment (FIG. 2). At time T1, the binarization unit 114 starts binarization processing with respect to the first frame (#0). During the binarization processing, binary data is generated; thus, in order to record the binary data into the recording medium 119 as needed, the recording processing unit 118 starts an operation of recording the binary data into the recording medium 119 at time T2. In FIG. 6A, to simplify the explanation, it appears that the recording processing unit 118 is always in operation. However, in reality, the binary data is first buffered and then recorded into the recording medium 119; thus, it is not the case that the recording processing unit 118 is always performing the operation of recording the binary data into the recording medium 119.

In the timing chart shown in FIG. 6A, for example, provided that a period from time T1 to time T3 is one second, the timing chart indicates that still image data of ten frames from #0 to #9 is encoded and recorded in one second, and thus continuous shooting is performed at a rate of ten frames per second.

Next, FIG. 6B will be described. FIG. 6B corresponds to the second embodiment (FIG. 5). In FIG. 6B, as described with reference to FIG. 5, when the arithmetic coding unit 117 is not currently in operation, control is performed so as to put the arithmetic coding unit 117 in operation.

At time T4, the binarization unit 114 starts binarization processing with respect to the first frame (#0). Also, at the timing of time T4, the control unit 120 determines whether the arithmetic coding unit 117 is in operation. As the arithmetic coding unit 117 is not in operation at time T4, binary data of the first frame (#0) is transmitted to the arithmetic coding unit 117. From time T5, processing for performing arithmetic coding of the binary data generated by the binarization unit 114 is started. It is assumed that the binary data is recorded into a non-illustrated buffer and held until time T8 at which the arithmetic coding processing is completed. In order to record arithmetic code data generated by the arithmetic coding unit 117 into the recording medium 119, the recording processing unit 118 starts an operation of recording the arithmetic code data into the recording medium 119 at time T6.

From time T7, binarization processing for the second frame (#1) is started. At this time, as the arithmetic coding unit 117 is performing the arithmetic coding processing with respect to the first frame (#0), it is determined that the arithmetic coding unit 117 is currently in operation. Therefore, the control unit 120 performs control so that, with respect to the second frame (#1), binary data is recorded into the recording medium 119 without generating arithmetic code data.

Ina period from time T7 to time T8, the recording processing unit 118 records both of the arithmetic code data and binary data into the recording medium 119. In FIG. 6B, to simplify the explanation, it appears that both types of data are recorded simultaneously. However, in reality, writing into the recording medium 119 is enabled by buffering both types of data into a non-illustrated storage region and by recording the data into the recording medium 119 using a time-division method.

Similarly to the case of FIG. 6A, provided that a period from time T4 to time T9 is one second, processing of continuous shooting of still images is performed at a rate often frames per second. When control is performed as described with reference to FIG. 5 and FIG. 6B, the number of frames per second (the speed of continuous shooting) does not decrease compared to FIG. 6A, even if the arithmetic coding unit 117 is put in operation.

Furthermore, as in FIG. 6B, with respect to the first frame (#0), the fifth frame (#4), and the eighth frame (#7), the result of arithmetic coding (arithmetic code data) is recorded into the recording medium 119. The arithmetic code data is data that can be decoded even on a reproduction apparatus that does not include the decoding apparatus 300. As such, the second embodiment makes it possible to, although intermittently, generate data that is compatible with a reproduction apparatus that does not include the decoding apparatus 300.

As described above, according to the second embodiment, even during continuous shooting of still images, the encoding apparatus 100 performs arithmetic coding of binary data that corresponds to image data to be processed when arithmetic coding of another binary data is not currently in execution. This makes it possible to generate arithmetic code data with respect to a part of still images while suppressing a reduction in the speed of continuous shooting of still images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-181652, filed Oct. 1, 2019 which is hereby incorporated by reference herein in its entirety.

What is claimed is:

1. An encoding apparatus comprising at least one processor and/or at least one circuit which functions as:
   a data processing unit configured to generate binary data by performing data processing, including binarization processing, with respect to image data that has been input from an image capturing unit;
   an arithmetic coding unit configured to generate arithmetic code data by performing binary arithmetic coding of the binary data; and
   a control unit configured to perform control so as to:
   record the binary data into a recording unit without performing the binary arithmetic coding to generate the arithmetic code data when the image data is still image data generated during continuous shooting of still images; and
   perform the binary arithmetic coding to generate the arithmetic code data and record the arithmetic code data into the recording unit when the image data is still image data generated by shooting of a single still image.

2. The encoding apparatus according to claim 1, wherein when the binary data has been recorded into the recording unit, the control unit performs control so as to, in a period in which input of new image data by the image capturing unit is not performed, perform the binary arithmetic coding of the binary data recorded in the recording unit to generate the arithmetic code data and record the arithmetic code data into the recording unit.

3. The encoding apparatus according to claim 2, wherein after the arithmetic code data has been generated from the binary data recorded in the recording unit, the control unit performs control so as to delete the binary data from the recording unit.

4. The encoding apparatus according to claim 1, wherein even when the image data is still image data generated during continuous shooting of still images, the control unit performs control so as to perform the binary arithmetic coding to generate the arithmetic code data from the binary data and record the arithmetic code data into the recording unit if the arithmetic coding unit is not currently executing binary arithmetic coding of another binary data.

5. The encoding apparatus according to claim 1, wherein when the image data is moving image frame data generated during shooting of a moving image, the control unit performs control so as to record the binary data into the recording unit without performing the binary arithmetic coding to generate the arithmetic code data.

6. The encoding apparatus according to claim 1, wherein when the image data is moving image frame data generated during shooting of a moving image, the control unit performs control so as to perform the binary arithmetic coding to generate the arithmetic code data and record the arithmetic code data into the recording unit.

7. An image capturing apparatus, comprising:
the encoding apparatus according to claim 1; and
the image capturing unit.

8. A control method executed by an encoding apparatus, the encoding apparatus comprising at least one processor and/or at least one circuit which functions as:
a data processing unit configured to generate binary data by performing data processing, including binarization processing, with respect to image data that has been input from an image capturing unit; and
an arithmetic coding unit configured to generate arithmetic code data by performing binary arithmetic coding of the binary data,
the control method comprising performing control so as to:
record the binary data into a recording unit without performing the binary arithmetic coding to generate the arithmetic code data when the image data is still image data generated during continuous shooting of still images; and
perform the binary arithmetic coding to generate the arithmetic code data and record the arithmetic code data into the recording unit when the image data is still image data generated by shooting of a single still image.

9. A non-transitory computer-readable storage medium which stores a program for causing a computer of an encoding apparatus to execute a control method,
the encoding apparatus comprising at least one processor and/or at least one circuit which functions as:
a data processing unit configured to generate binary data by performing data processing, including binarization processing, with respect to image data that has been input from an image capturing unit; and
an arithmetic coding unit configured to generate arithmetic code data by performing binary arithmetic coding of the binary data,
the control method comprising performing control so as to:
record the binary data into a recording unit without performing the binary arithmetic coding to generate the arithmetic code data when the image data is still image data generated during continuous shooting of still images; and
perform the binary arithmetic coding to generate the arithmetic code data and record the arithmetic code data into the recording unit when the image data is still image data generated by shooting of a single still image.

\* \* \* \* \*